(12) United States Patent
Xin

(10) Patent No.: US 10,469,984 B1
(45) Date of Patent: Nov. 5, 2019

(54) LOCATION BASED INFORMATION PROVIDING SYSTEM

(71) Applicant: Alfred X Xin, Cincinnati, OH (US)

(72) Inventor: Alfred X Xin, Cincinnati, OH (US)

( * ) Notice: Subject to any disclaimer, the term of this patent is extended or adjusted under 35 U.S.C. 154(b) by 0 days.

(21) Appl. No.: 15/957,862

(22) Filed: Apr. 19, 2018

(51) Int. Cl.
*H04W 4/02* (2018.01)
*H04W 4/021* (2018.01)
*G06F 8/61* (2018.01)

(52) U.S. Cl.
CPC .............. *H04W 4/021* (2013.01); *G06F 8/61* (2013.01); *H04W 4/026* (2013.01)

(58) Field of Classification Search
CPC .......... H04W 4/021; H04W 4/026; G06F 8/61
See application file for complete search history.

(56) References Cited

U.S. PATENT DOCUMENTS

| | | | |
|---|---|---|---|
| 8,521,128 B1* | 8/2013 | Welsh | H04W 4/21 455/404.2 |
| 2008/0147730 A1* | 6/2008 | Lee | G06Q 30/0212 |
| 2012/0194547 A1* | 8/2012 | Johnson | G06T 11/00 345/632 |
| 2017/0124401 A1* | 5/2017 | Choi | G06K 9/00785 |

* cited by examiner

*Primary Examiner* — Marcos L Torres

(57) ABSTRACT

A location based information providing system operates utilizing a communicably coupled mobile device and a mobile software application communicating with its remote server installed on the mobile device and providing a user interface for operation. The mobile device includes a GPS module, a compass, an aiming device and a digital map communicating with remote server of the digital map. A user points the mobile device at a building and the software extrapolates a straight line intermediate the mobile device and the building. The location of the mobile device is determined utilizing the GPS module and a check along the extrapolated straight line by cross referencing with the digital map is executed until a potential identity of the building is determined. The user is sent an image and data of the identity of the building. A widened search range angle is executed if the mobile device is close to the building.

20 Claims, 17 Drawing Sheets

| Degree | Meters | Longitude | Latitude | |
|---|---|---|---|---|
| 60.584932 | 0 | -73.985259 | 40.747818 | Starting point |
| | 2 | -73.985247 | 40.747834 | |
| | 4 | -73.985236 | 40.747849 | |
| | 6 | -73.985224 | 40.747865 | |
| | 8 | -73.985212 | 40.747881 | |
| | 10 | -73.985201 | 40.747896 | |
| | 12 | -73.985189 | 40.747912 | |
| | 14 | -73.985177 | 40.747928 | |
| | 16 | -73.985166 | 40.747943 | |
| | 18 | -73.985154 | 40.747959 | |
| | 20 | -73.985142 | 40.747975 | |
| | 22 | -73.985131 | 40.747990 | |
| | 24 | -73.985119 | 40.748006 | |
| | 26 | -73.985107 | 40.748022 | |
| | 28 | -73.985096 | 40.748037 | |
| | 30 | -73.985084 | 40.748053 | |
| | 32 | -73.985072 | 40.748069 | |
| | 34 | -73.985061 | 40.748084 | |
| | 36 | -73.985049 | 40.748100 | |
| | 38 | -73.985037 | 40.748116 | |
| | 40 | -73.985026 | 40.748131 | |
| | 42 | -73.985014 | 40.748147 | |
| | 44 | -73.985002 | 40.748163 | |
| | 46 | -73.984991 | 40.748178 | |
| | 48 | -73.984979 | 40.748194 | |
| | 50 | -73.984967 | 40.748210 | |
| | 52 | -73.984956 | 40.748225 | |
| | 54 | -73.984944 | 40.748241 | |
| | 56 | -73.984933 | 40.748257 | |
| | 56.45 | -73.984930 | 40.748260 | Location aimed |
| | 58 | -73.984921 | 40.748272 | Ending point |

Fig.3A

| Obj_ID | Multiple Sub Loc | Address 1 | Address 2 | Address zip | Sub_Pos | Name | Longitude | Latitude | Image | Loc_data | Sub_loc_data |
|---|---|---|---|---|---|---|---|---|---|---|---|
| DB_Loc_120009 | S | 120 Main St. | NY | 12345 | non | The French Corner | -73.984930 | 40.748260 | 20302.png | data | non |
| DB_loc_120450_0 | M | 125 Main St. | NY | 12345 | 0 | Main Street Office Complex | -73.984521 | 40.748260 | 140294.png | data | non |
| DB_loc_120450_1 | Y | 125 Main St. | NY | 12345 | 101 | ABC Sales | -73.984521 | 40.748260 | 30302.png | non | data |
| DB_loc_120450_2 | Y | 125 Main St. | NY | 12345 | 102 | Mom's Shop | -73.984521 | 40.748260 | 92802.png | non | data |
| DB_loc_120450_3 | Y | 125 Main St. | M | 12345 | 103 | Building Office | -73.984521 | 40.748260 | 74892.png | non | data |
| DB_loc_120450_4 | Y | 125 Main St. | NY | 12345 | 201 | Best Law Firm | -73.984521 | 40.748260 | 85932.png | non | data |
| DB_loc_120450_5 | Y | 125 Main St. | NY | 12345 | 202 | Skilled Drawing | -73.984521 | 40.748260 | 10980.png | non | data |
| DB_loc_120450_6 | Y | 125 Main St. | NY | 12345 | 203 | Payroll Line | -73.984521 | 40.748260 | 40302.png | non | data |
| DB_loc_120450_7 | Y | 125 Main St. | NY | 12345 | 301 | Fine Studio | -73.984521 | 40.748260 | 40301.png | non | data |
| DB_loc_120450_7 | Y | 125 Main St. | NY | 12345 | 302 | AC Flowers | -73.984521 | 40.748260 | 40309.png | non | data |
| DB_loc_120450_8 | Y | 125 Main St. | NY | 12345 | 303 | Payroll Line | -73.984521 | 40.748260 | 59902.png | non | data |
| DB_loc_120450_9 | Y | 125 Main St. | NY | 12345 | 401 | Data Firm | -73.984521 | 40.748260 | 92010.png | non | data |
| DB_loc_120450_10 | Y | 125 Main St. | NY | 12345 | 402 | non | -73.984521 | 40.748260 | 81092.png | non | data |
| DB_loc_120450_11 | Y | 125 Main St. | M | 12345 | 403 | TC accounting | -73.984521 | 40.748260 | 18380.png | non | data |
| DB_loc_120450_12 | Y | 125 Main St. | NY | 12345 | 501 | IT Consulting | -73.984521 | 40.748260 | 46302.png | non | data |
| DB_loc_120450_13 | Y | 125 Main St. | NY | 12345 | 502 | Party host | -73.984521 | 40.748260 | 46301.png | non | data |
| DB_loc_120450_14 | Y | 125 Main St. | NY | 12345 | 503 | For rent | -73.984521 | 40.748260 | 41109.png | non | data |
| DB_loc_120450_15 | Y | 125 Main St. | NY | 12345 | 601 | BBB Marketing | -73.984521 | 40.748260 | 59402.png | non | data |
| DB_loc_120450_16 | Y | 125 Main St. | NY | 12345 | 602 | Home finder LLC | -73.984521 | 40.748260 | 32410.png | non | data |
| DB_loc_120450_17 | Y | 125 Main St. | NY | 12345 | 603 | City Staffing | -73.984521 | 40.748260 | 92410.png | non | data |
| more records | | | | | | | | | | | |

Fig.3B

LOCATION BASED INFORMATION PROVIDING SYSTEM

PRIORITY UNDER 35 U.S.C SECTION 119(e) & 37 C.F.R. SECTION 1.78

This nonprovisional application claims priority based upon the following prior United States Provisional Patent Application entitled: System and Method of Aiming and Selecting data of onsite Location with Mobile Device, Application No. 62/571,337 filed Oct. 12, 2017, in the name of Alfred X. Xin, which is hereby incorporated by reference for all purposes

FIELD OF THE INVENTION

The present invention relates generally to a information providing system, more specifically but not by way of limitation, a location based data system that is operable to provide users of the system information on entities to which they are proximate wherein the information is provided to a user on demand.

BACKGROUND

Location based data provides onsite mobile users with information about entities surrounding their onsite locations within a particular range. However, information provided onsite to users may be overwhelming and much of it may not be useful or of interest for the users. Information may be pushed to a user once a user has been identified as being in a particular geographic area but many times the user receives information about an entity, which is of no interest to the user nor was not requested. Numerous types of businesses are utilizing these types of location based marketing programs to push data in the form of special offers and the like based upon the detection of a user within a particular range of the business entity.

Accordingly, there is a need for a location based data providing system that only retrieves and provides information to a user subsequent a demand request from a user wherein the information is transmitted to a mobile device of the user.

SUMMARY OF THE INVENTION

It is the object of the present invention to provide a location based data providing system that includes a software application configured to be installed on mobile devices such as but not limited to a smart phone.

Another object of the present invention is to provide a data providing system that further includes a digital aiming device integrated with geo-location technology.

A further object of the present invention is to provide a location based data providing system that includes a remote database server that is configured to allow an owner or tenant of a building, a structure or a commercial space to upload location related data via a secure website portal.

Still another object of the present invention is to provide a location based data providing system wherein the mobile application of the system is configured to access real time data of a digital map synchronized with its remote database server.

An additional object of the present invention is to provide a mobile application that is configured to allow a user of a mobile device to select a location by pointing and aiming the mobile device at a location wherein the pointing of the mobile device further includes providing of geolocation data of the mobile device.

Yet a further object of the present invention is to provide a mobile geolocation based information service that further provides latitude, Y-coordinates that are between 0 and +90 degrees, aiming direction which is compass correlated in conjunction with longitude, X-coordinates between 0 and +180 degrees, and latitude wherein the latitude and longitude are calculated by the mobile software application of the present invention.

An alternate object of the present invention is to provide a software application that is configured to extrapolate a straight line by incremental measuring points along the aiming direction and calculate longitude and latitude value at each of the incremental measuring points.

Another object of the present invention is to provide a geolocation based information service having a mobile software application that is also configured to setup wide range of search and check with synchronized real time data of digital maps.

Yet a further object of the present invention is to provide a geolocation based information service having a mobile software application that is configured to retrieve and display data of the first matched location via the mobile device.

An additional object of the present invention is to provide a information providing service using geolocation that includes a mobile software application that is further configured to send a request for more information of a location to the remote database server and the remote database server is configured to retrieve and send data related to the location submitted by an owner, tenants or collected from other resources of the location to a requesting user.

Another object of the present invention is to provide a geolocation based information service having a mobile software application that is configured to display or show data in various formats to a user wherein the user has alternate interfaces.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1A:
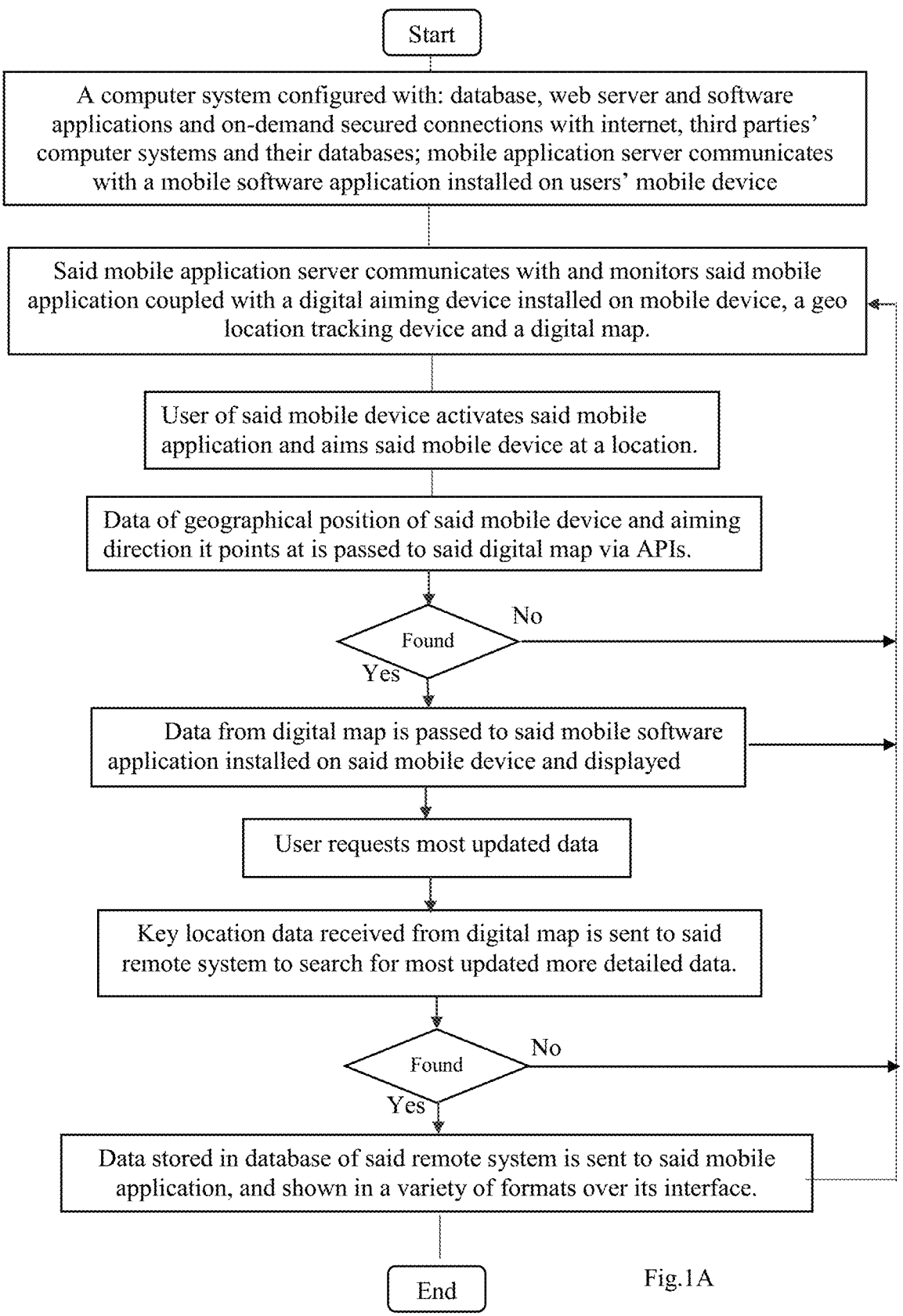
FIG. 1A illustrates a flowchart that demonstrates process flows of the system and methods of aiming and selecting directional data of onsite location with mobile device within the scope of the present invention.
Figure 1B:
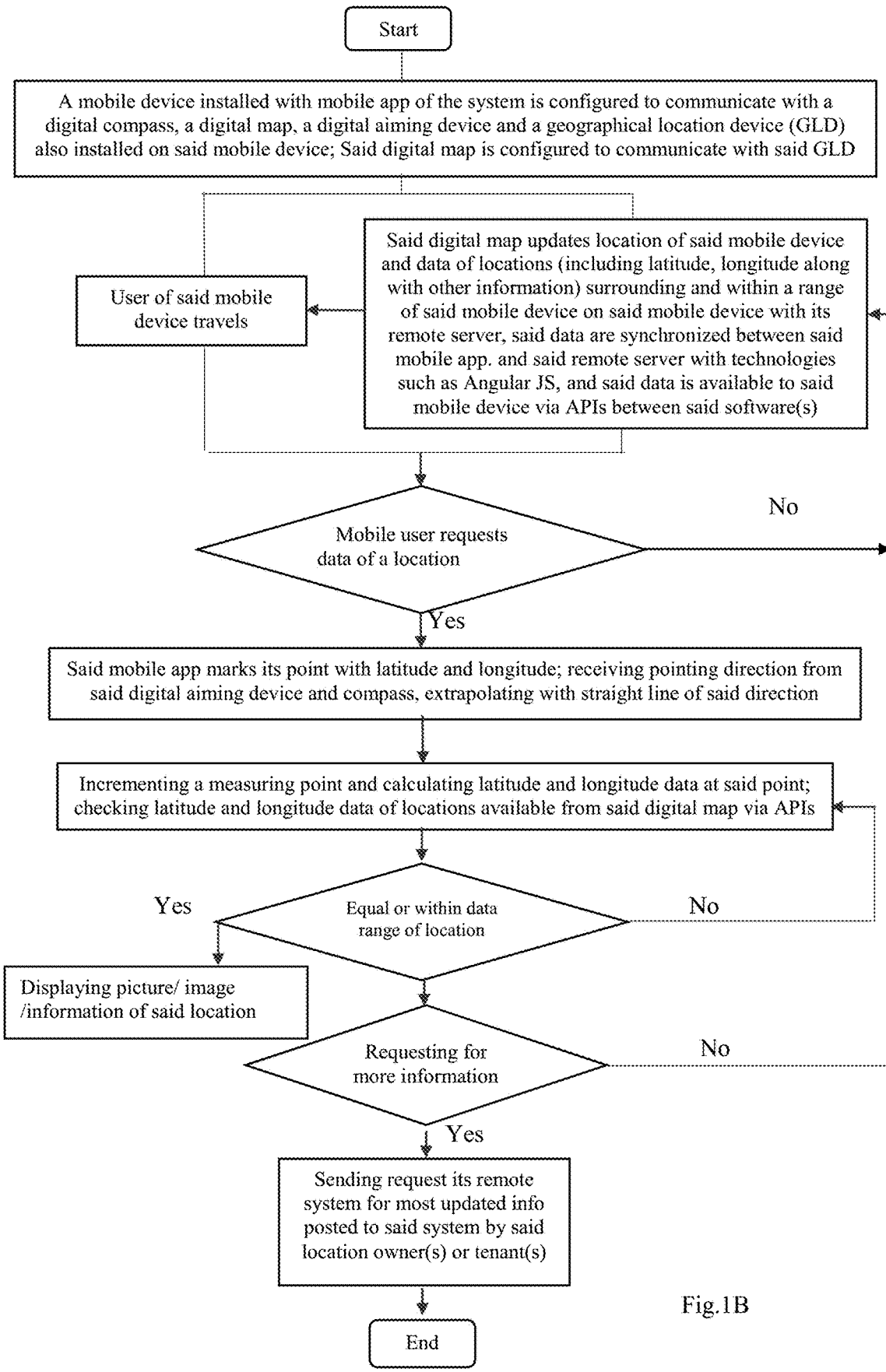
FIG. 1B illustrates a flowchart that demonstrates process flows of aiming, requesting and receiving directional information with a mobile device having the software application of the present invention.
Figure 1C:
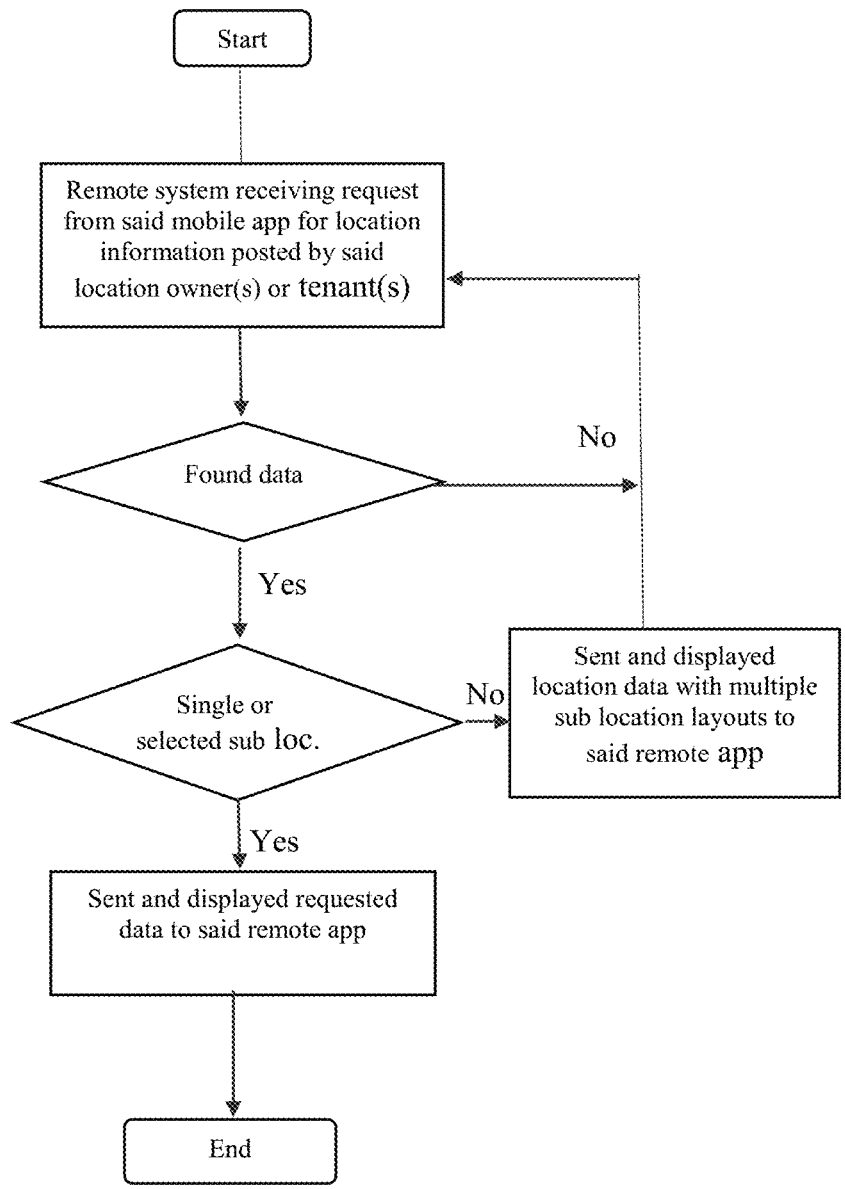
FIG. 1C is a illustrates a flowchart that demonstrates process flows of the remote database server receiving request from the mobile software application and selecting and sending requested data back to the mobile software application.

Referring now to the drawings submitted herewith, wherein various elements depicted therein are not necessarily drawn to scale and wherein through the views and figures like elements are referenced with identical reference numerals, there is illustrated a geolocation information system constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer process running on a processor, a processor, a device, a process, a computer thread, or the like. In another aspect, such terms may include both an application running on a processor and a processor.

Moreover, terms such as "access point," "server," and the likes, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference).

A network typically includes a plurality of elements that host logic. In packet based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device(s) owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, xth generation long-term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include but are not limited to cellular telephones (e.g., smart phones), personal digital assistants (PDAs), portable computers, tablet computers (tablets), hand-held gaming counsels, wearables (e.g., smart watches) and desktop computers.

It is noted that user equipment devices can communicate with each other and with other elements via a network, for instance, a wireless network, or a wireline network. A "network" can include broadband wide-area networks such as cellular networks, local area networks, wireless local-area networks (e.g., Wi-Fi), and personal area networks, such as near-field communication networks including BLUETOOTH®. Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

Referring in particular to FIG. 1A-C, FIG. 2A-E and FIG. 3A-B a preferred embodiment of the present invention that facilitates the receiving of data by a user via aiming towards and selecting a location with a mobile device. A user of a mobile device installed with the mobile software application of the present invention wherein the mobile device has a digital aiming device installed thereon. Furthermore, a mobile device configured to be utilized as part of the present invention is configured with geographical location device, a digital map and a compass. The mobile software application of the present invention facilitates communication with a remote database server via the Internet. As a user (who is in possession of a mobile device having the software application of the present invention) traverses a street and notices a restaurant or other business nearby (1 of FIG. 2A), the user may have an interest in obtaining more information about the restaurant or business. The user ensures the mobile phone is powered on and (2 of FIG. 2A) and starts up said mobile application.

The startup screen of the mobile software application displays an arrow at the top end of the screen (3 of FIG. 2A) indicating the direction in which the aiming device (integrated into the mobile device is pointed. The user of the mobile device aims the mobile device at a desired structure such as but not limited to a restaurant (4 of FIG. 2A). The mobile software application of the present invention receives coordinated geo-position (1 of 2B) (Longitude: 73.985259; Latitude: 40.747818) of the mobile device from an integrated geolocation module such as but not limited to a GPS module and aiming-direction data (2 of 2B), by way of example but not limitation, North of east: 60.584932 from the compass. Subsequently the software processor of the mobile software application starts to extrapolate a straight line in the aiming direction, calculating at two meters per point. The software application of the present invention cross-references with real time data of the digital map uploaded from the remote server until the longitude and latitude calculated at an incremental measuring point with the extrapolated straight line matches or is within range of longitude and latitude of a first location stored within the digital map (FIG. 3A).

By way of example but not limitation, in the aforementioned instance the first location in the targeted direction is at 56.45 meters with Longitude: 73.984930 and latitude: 40.748260. The incremental measuring point is two meters and the first location is not detected when the mobile software application verifies with real time data of the digital map at incremental point of 56 meters. The process continues to extrapolate at regular measuring at 2 meters a point. When the mobile application checks with real time data of the digital map at 58 meters, the coordination of geo-position is longitude: 73.984*921 and latitude: 40.748272. The mobile software application again verifies real time data of the digital map for equal or within range conditions. Since the first location in the aimed direction is at geo-position coordination of 56.45 meters that is within range of geo-position coordination at 58 meters (FIG. 3B).

Figure 2A:
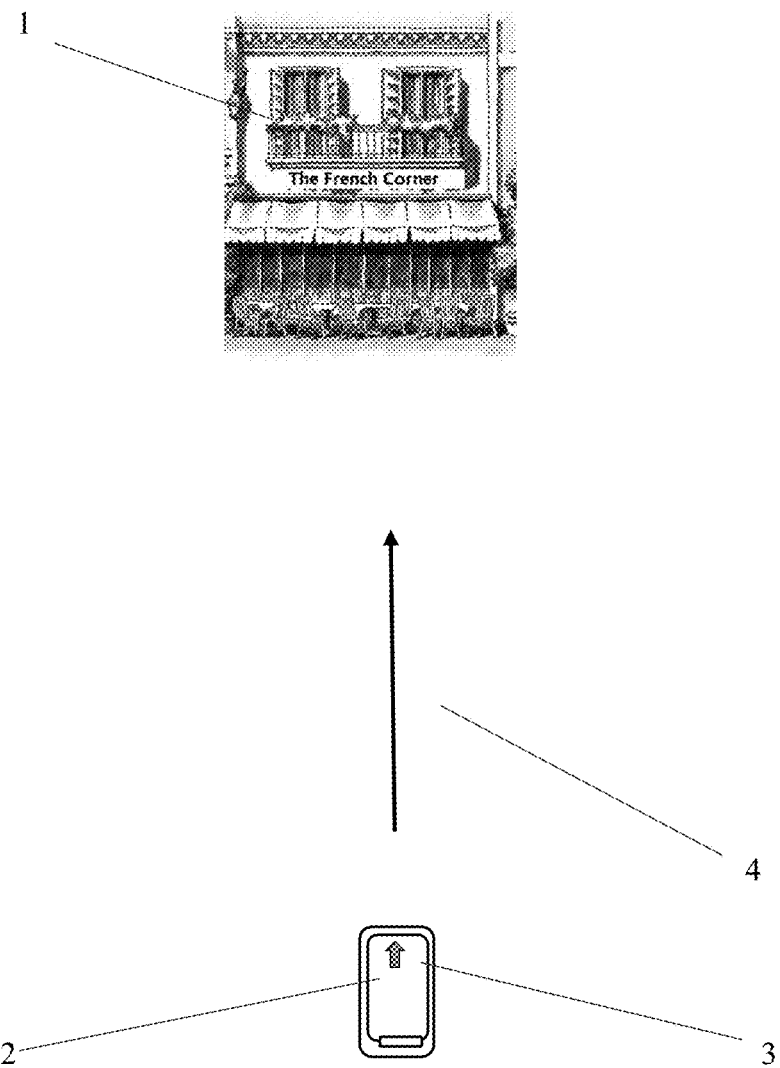
FIG. 2A illustrates a scenario of user with a mobile device having the mobile software application of the present invention aiming at a single structure in a street.
Figure 2B:
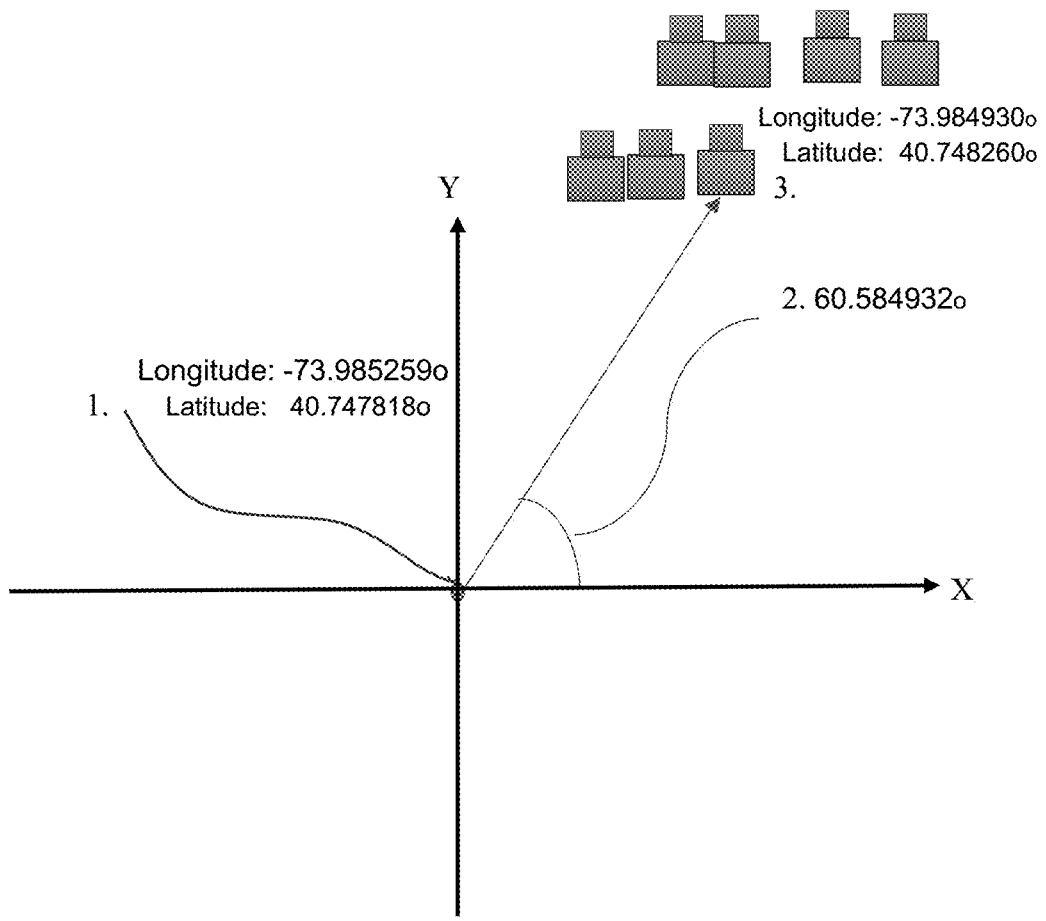
FIG. 2B illustrates data with coordination of longitude and latitude for geographical position of a mobile device and geographical direction that the mobile device aims at an onsite location.
Figure 2C:
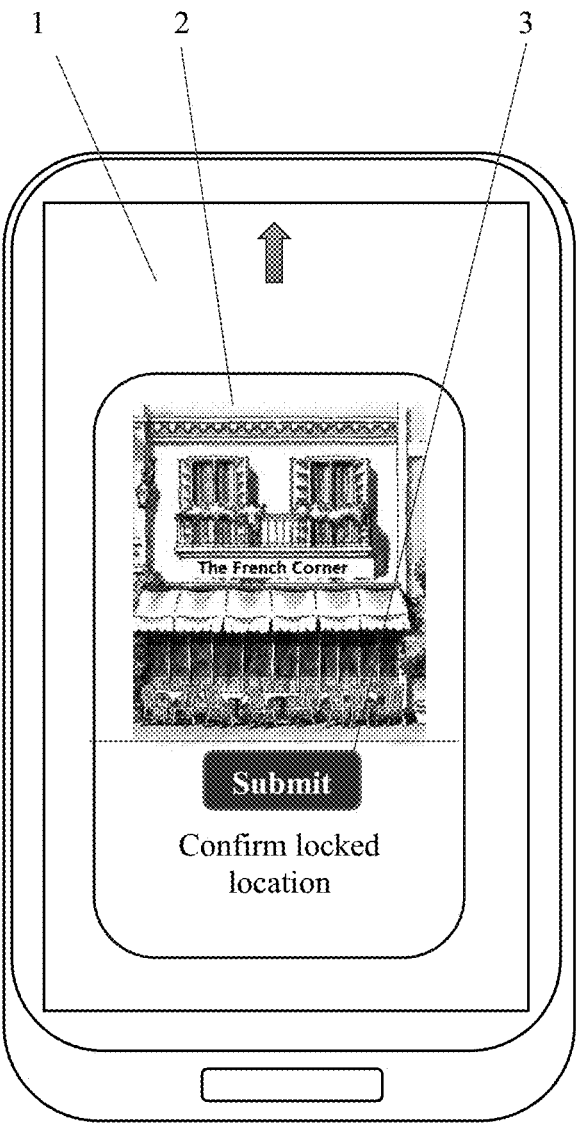
FIG. 2C illustrates a display rendering of a screen of a mobile application with a location aimed at by user of the mobile device and the location is recorded by the mobile software application and an image of the location is retrieved from a digital map and displayed on the user's mobile device for confirmation.
Figure 2D:
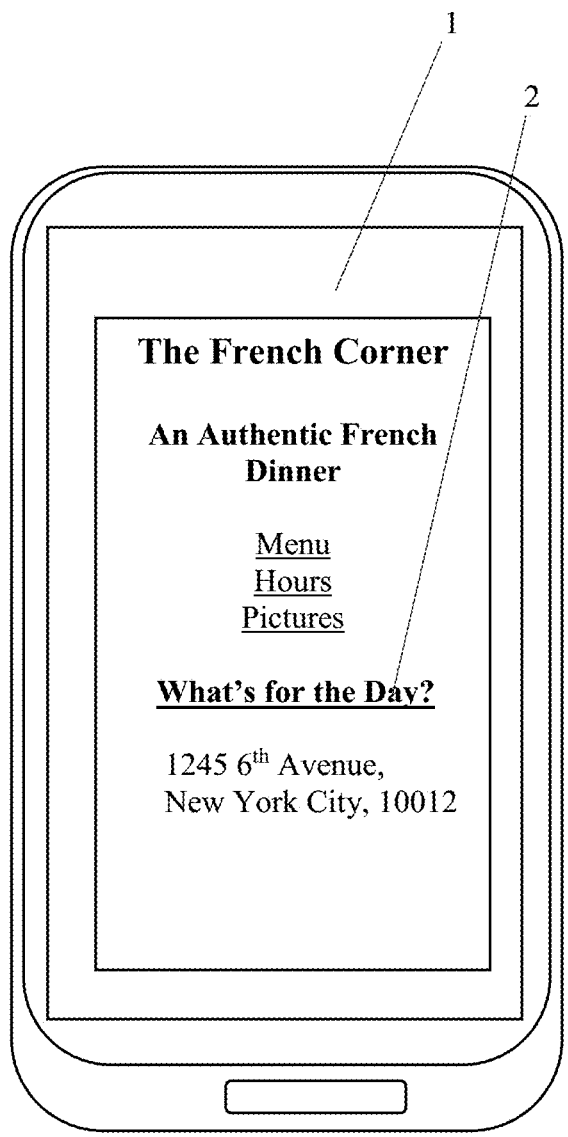
FIG. 2D illustrates an exemplary rendering of a screen of the mobile software application with information received from web search or database of the digital map configured with the mobile application and with an option to demand more detailed and updated data.
Figure 2E:
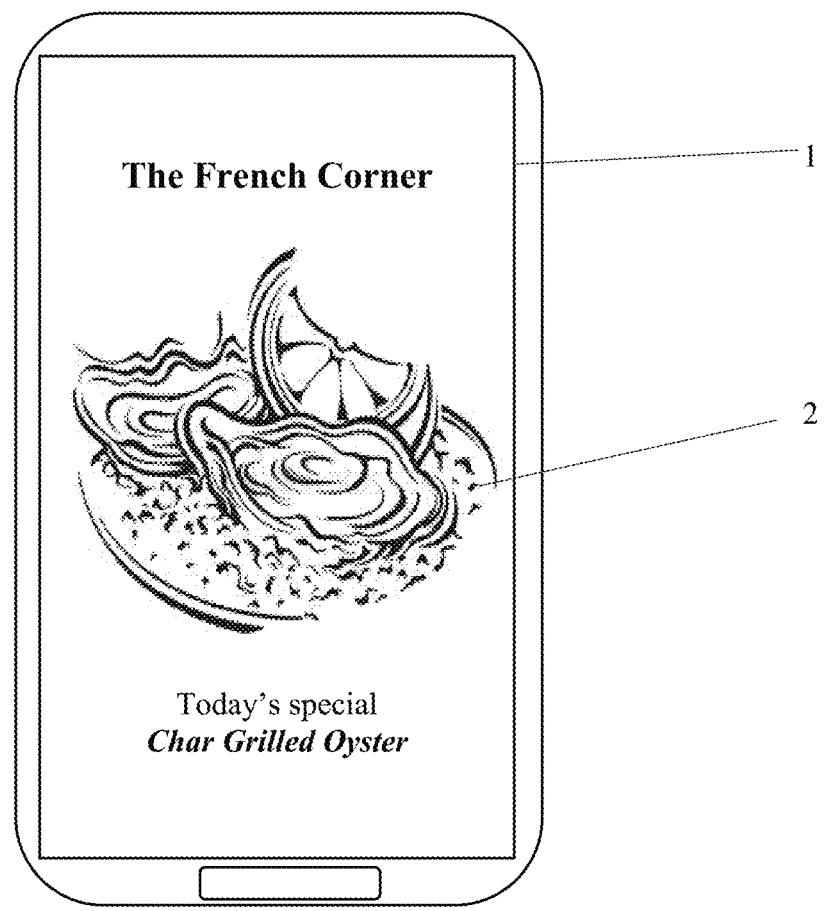
FIG. 2E illustrates an exemplary rendering of a screen shot of a video clip introducing a special item of the day wherein the video clip is uploaded by a location owner to the remote database server via a secured account.
Figure 2F:
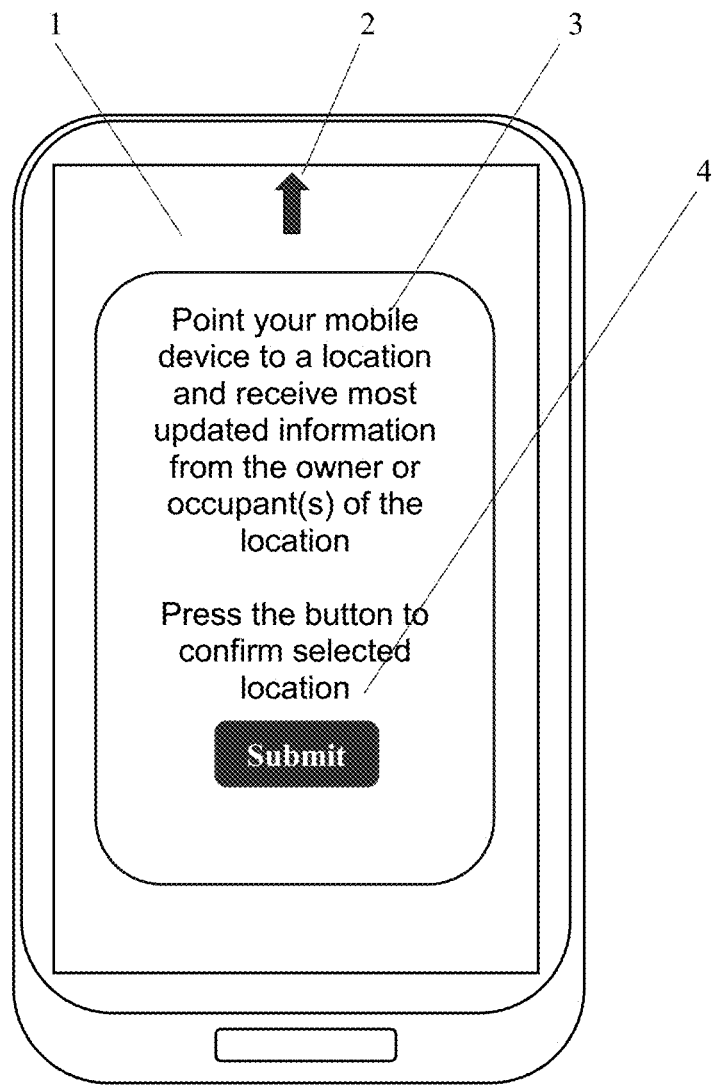
FIG. 2F illustrates an exemplary rendering of a screen of the mobile software application aiming at a location and requesting confirmation of a location without showing image of said location.
Figure 2G:
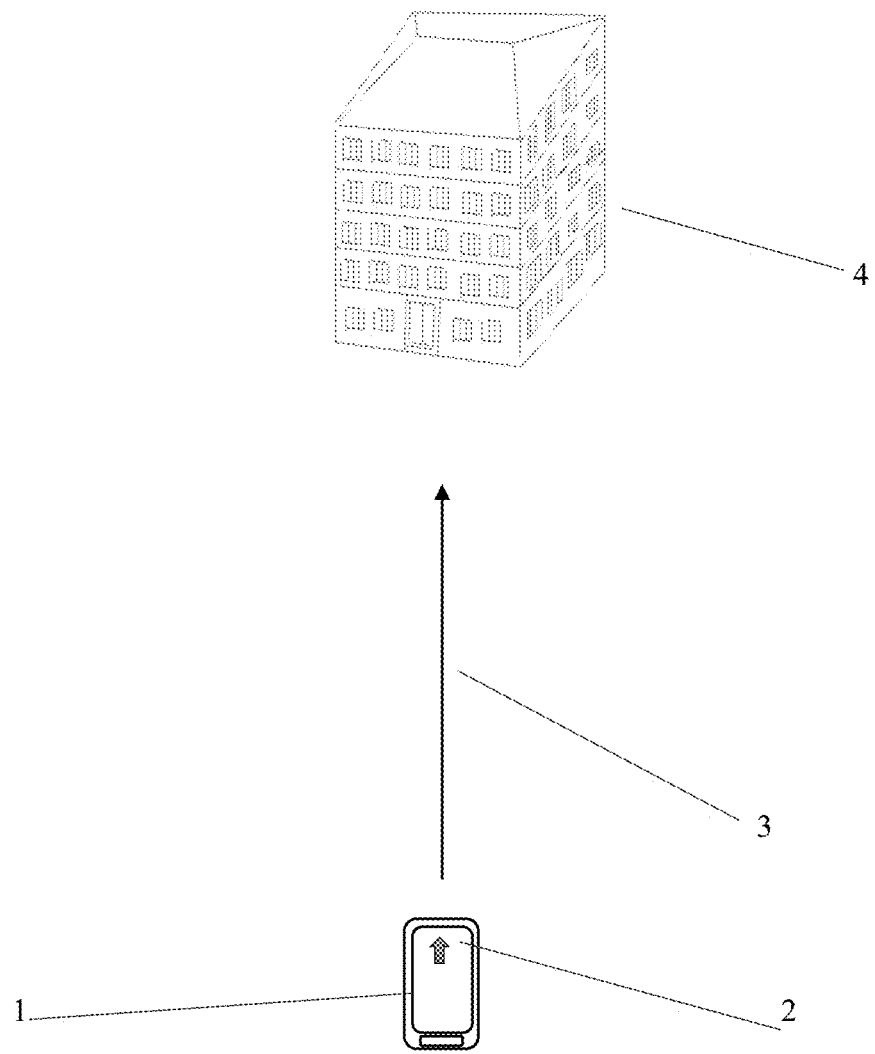
FIG. 2G illustrates a scenario of user with a mobile device installed with the mobile software application of the present invention aiming at a location with multiple sub locations.
Figure 2H:
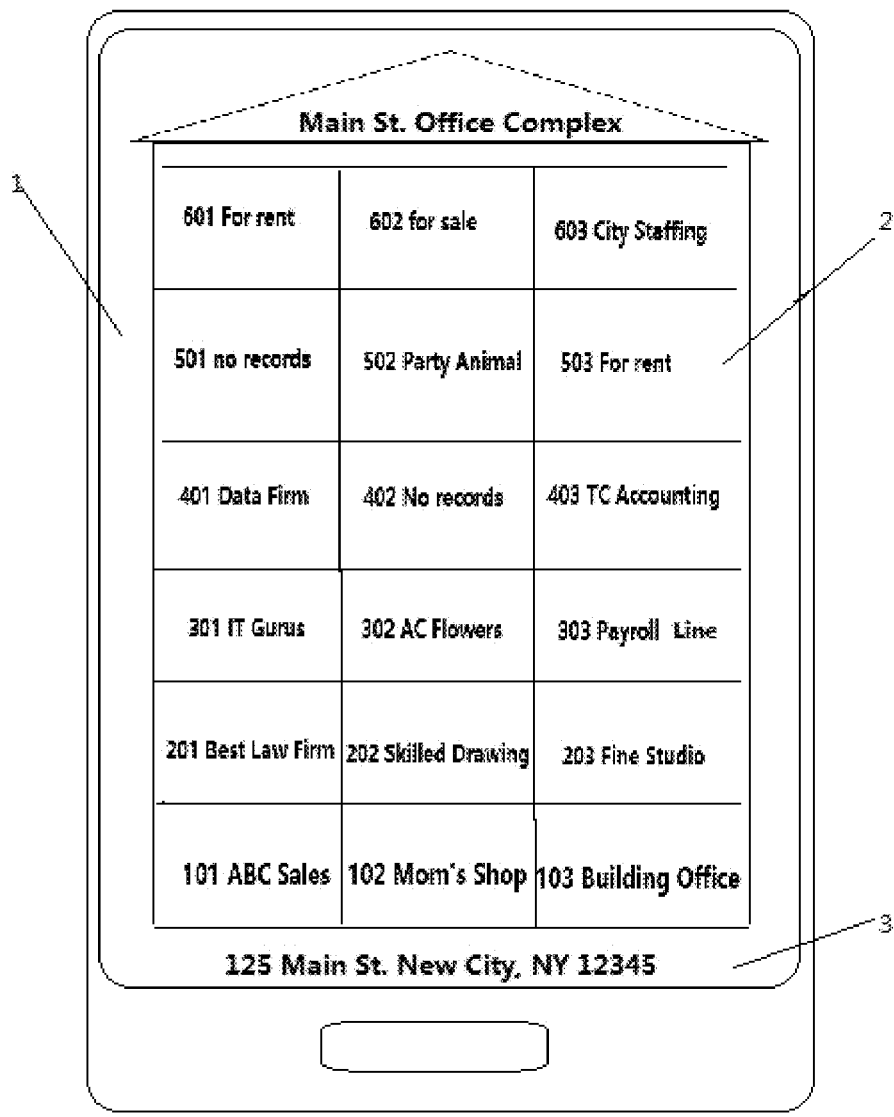
FIG. 2H illustrates an exemplary display of a screen of the mobile software application showing a location with multiple sub locations.
Figure 2I:
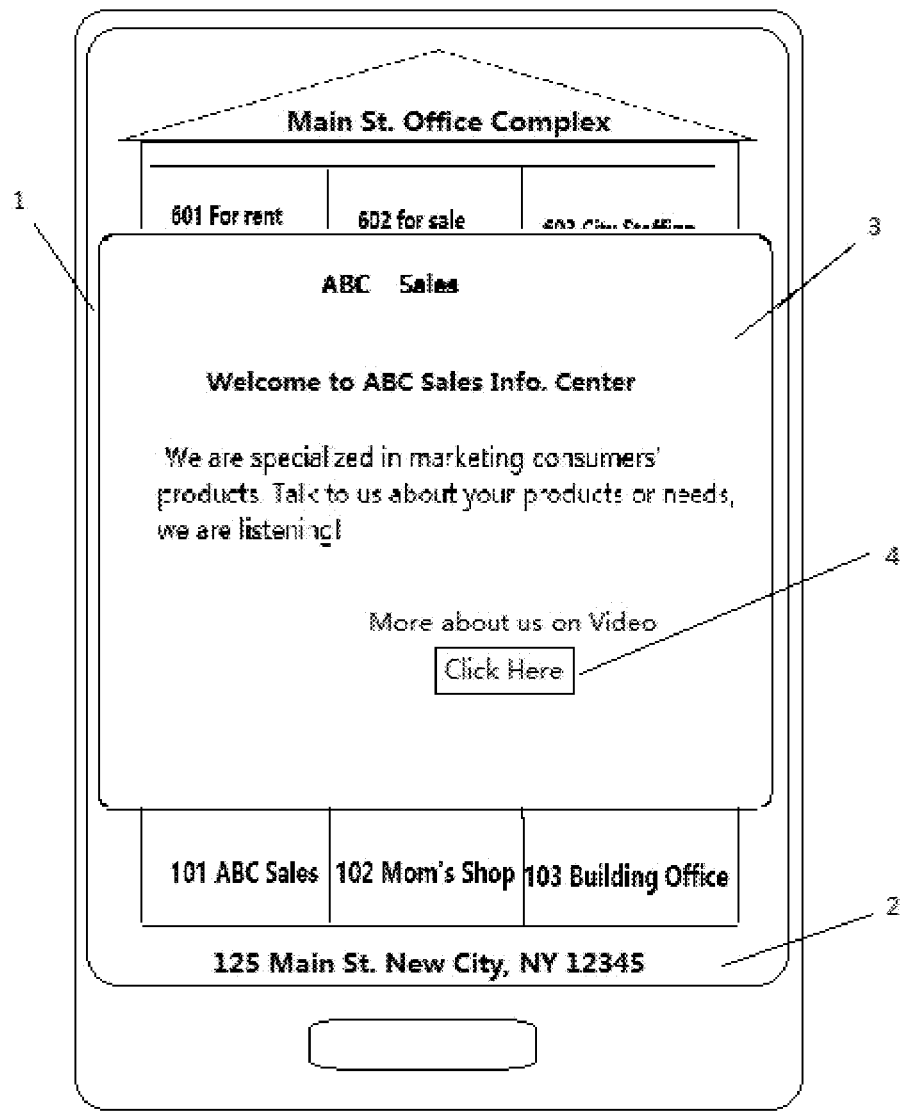
FIG. 2I illustrates an exemplary display rendering of a screen of the mobile software application showing detailed information of a sub location selected by user of the mobile device having the mobile software application of the present invention.

The mobile software application (1 of FIG. 2C) selects image of a location from real time data that has been uploaded to the digital map from the remote server and displays over an interface of said mobile application (2 of FIG. 2C) with message to "Submit" and confirm selected location (3 of FIG. 2C). The user touches "Submit" button, and information of the first location, by way of example herein a restaurant, is displayed over an interface of mobile application (1 of FIG. 2D). Additionally the interface also displays a link for most updated information (2 of FIG. 2D). The user engages the link and the mobile software application forwards a request to the remote database server. The remote database server checks its database table (FIG. 3B) for type of structure of the location and the location is marked as a single location. Subsequently the remote database server sends a video clip that has been updated by an owner of the first location via a secured account with a website or a mobile software application communicably coupled with the remote database server. The mobile software application and plays the video clip (2 of FIG. 2E) over an interface of said mobile application (2 of FIG. 2E) such as but not limited to a display screen.

To calculate and process this function the mobile software application is configured to perform a mathematic formula as follows:

Latitude lat=lat0+x_(sin(ang)/r)_(180/_)

Longitude lon=lon0+x_(cos(ang)/(r_sin(90−lat0)))_(180/_).

In example herein the initial coordinates are:
lat0=40.747818°
lon0=73.985259°
and the direction is: ang=60.584932° North of East
including the radius of Earth r=6371000 m.
and further including the radius of a circle of cross-section of Earth at latitude is r sin(90−lat0)
Then the calculation (FIG. 3A) of the instance is as follows:
where lat0=40.747818°, lon0=73.985259°, ang=60.584932°, r=6371000.

Referencing to drawings, in FIG. 1A-C, FIG. 2F-I and FIG. 3A-B of another preferred embodiment of system and methods of aiming and selecting data of onsite location with mobile device. A user of mobile device installed with said mobile application coupled with a digital aiming device installed on a mobile device with geographical location device and digital map and compass, communicates with a remote database server. Said user is interested in getting more information about a sub location within a location, and he turns on his mobile phone and starts up said mobile application (1 of FIG. 2F).

The startup screen of the mobile software application displays an arrow at top end of screen (2 of FIG. 2F) indicating the direction in which the mobile device is pointed. The user of the mobile device aims the mobile device at a location reference numeral 3 of FIG. 2G with multi-sub locations reference numeral 4 of FIG. 2G. The mobile software application is configured to allow users to confirm a selected location directly without retrieving an image of the location reference numerals 3 and 4 of FIG. 2F. The mobile software application allocated a first location by communicating with the compass and the digital map and processing the calculation procedures as previously described herein. The mobile software application forwards data of the location to the remote database server and the remote database server validates the location against its database. Ensuing validation of the location data from the remote database shows that the location is a large structure with multi-sub locations (FIG. 3B). The remote database server forwards an image of the location with url links leading to more detailed information to the mobile software application. The mobile software application displays the image over its interface (1, 3 and 3 of FIG. 2H) wherein the user of the mobile device selects a sub location (2 of FIG. 2I) within the displayed structure of the location over the interface of the mobile software application illustrated herein as 1 in FIG. 2I. Information about the sub location is displayed with options leading to more detailed information (4 of FIG. 2I).

Referencing the drawings, in particular FIG. 1A-C, FIG. 2F-I and FIG. 3A-D another preferred embodiment of the present invention contemplated within the scope of the present invention and support by the aforementioned drawings. A user with the mobile software application may select a location at very close range, and it is unlikely aiming direction will be as the same as longitude and latitude data recorded with the remote database server of the digital map due to the proximity of the structure, i.e. if a user is standing next to the building the user is close enough to the building that the user is already within the geographical boundaries thereof. In the aforementioned situation the calculation procedures of a wide-search range along a straight line and decreased search distance along the straight-line incremental measuring points until meet said location are altered in order to achieve desired results.

This instance of the mobile software application widened search range at 40 degrees (20 degree on each side of the straight line) at starting point of the straight line (1, 2 and 3 of FIG. 3C) to 10 meter mark, and reduced widened search range to 30 degree (15 degree on each side of the straight line) at 20 meter mark, and reduced widened search range to 20 degree (10 degree on each side of the straight line) at 30 meter mark, and reduced widened search range to 10 degree (5 degree on each side of said straight line) at 40 meter mark, and reduced widened search range to 5 degree (2.5 degree on each side of the straight line) at 50 meter mark. Since software of the mobile application will select only the closest location(s) along the straight line, all the other locations, around and behind the selected location will not be selected and the data will be displayed on the mobile device.

In the aforementioned circumstance the calculation "lat0=40.747818°, lon0=−73.985259°, ang=60.584932°, r=6371000" is modified and "ang" is setup as a variable. The mobile software application calculation procedures are executed as shown in FIG. 3A herein and "ang" is now a variable x in a loop in software processing of the mobile software application. The preferred variable x is as follows: at 10 m: x=scan search from 80.584932° to 40.584932° at 8 degree search interval. At 20 m: x=scan search from 75.584932° to 45.584932° at 4 degree search interval. At 30 m: x=scan search from 70.584932° to 50.584932°. at 2 degree search interval. At 40 m: x=scan search from 65.584932° to 55.584932° at 1 degree search interval. At 50 m: x=scan search from 62.584932° to 57.5.584932 at 0.5 degree search interval.

In the aforementioned example the mobile software application allocated Building 1 with a widened search within a 10-meter mark, Building 2 is further away than Building 1 and Building 3 is located on the straight line but further away from Building 1. Since the closest location from the starting point of the straight line is Building 1 and the straight line incremental measuring point is setup as 2 meters (referring to first prior embodiment). Once Building 1 is detected from synchronized data of the digital map, both straight line and widened search ranges processing are halted and Building 1 is selected and displayed over interface of the mobile software application.

Now referring to drawings, in FIG. 1A-C, FIG. 2F-I and FIG. 3E another alternative embodiment of the present invention contemplated within the scope of the present invention is supported by the aforementioned figures. The mobile software application is configured to setup a widened search range for selecting location(s) within a close range. A widened search is necessary when aiming the mobile device at a location that is within a close range and the targeted directional line is not likely to point at the center of the location being targeted and as such the data of the location will not be able to be ascertained from the digital map. The widened search range may vary based on distance of nearby locations around the geographic position of the mobile device as the mobile software application communicates with real time data of the digital map and calculates the distance of locations proximate to the mobile device. The closer distances of surrounding locations are to the mobile device a wider the search range will transpire. When a user of the mobile device installed with the mobile software application of the present invention aims the mobile device at a location, the mobile software application is configured to select and execute a calculation formula according to distance of locations surrounding the geographical position of the mobile device. Subsequent the formula calculation select data of locations from said digital map within said widened search range, and then select the closest location from position of said mobile device within said selected data of locations.

In the immediately aforementioned alternative embodiment when the user of the mobile device is aiming at a direction (1, 2 and 3 of FIG. 3E), the mobile software application selects and executes a math formula programmed for a widening search for locations within a very close distance of position of the mobile device. Further adding of a search range on both sides of said aiming direction (4 and 5 of FIG. 3E). The mobile software application first retrieves data of surrounding locations from the digital map then selects data of locations within the widened search channel and subsequently selects the closest location from the position of the user with the mobile device. In this case Buildings 1 to 4 are selected within a pre-defined search channel, and Buildings 5 to 10 are not selected for they are out of search channel since Building 1 is the closest location from position of the mobile device. Once Building 1 is allocated, the mobile software application stops and completes the search process and said mobile software application displays an image of Building 1 with data on the mobile device.

(New) Now referring to drawings, in FIG. 1A-C, FIG. 2F-I and FIG. 3F still another alternative embodiment of the present invention contemplated within the scope of the present invention is supported by the aforementioned figures. The mobile software application is configured to setup a narrowed and conditioned search range by selecting data available from the digital map location files (1 of FIG. 3E).

Figure 3C:
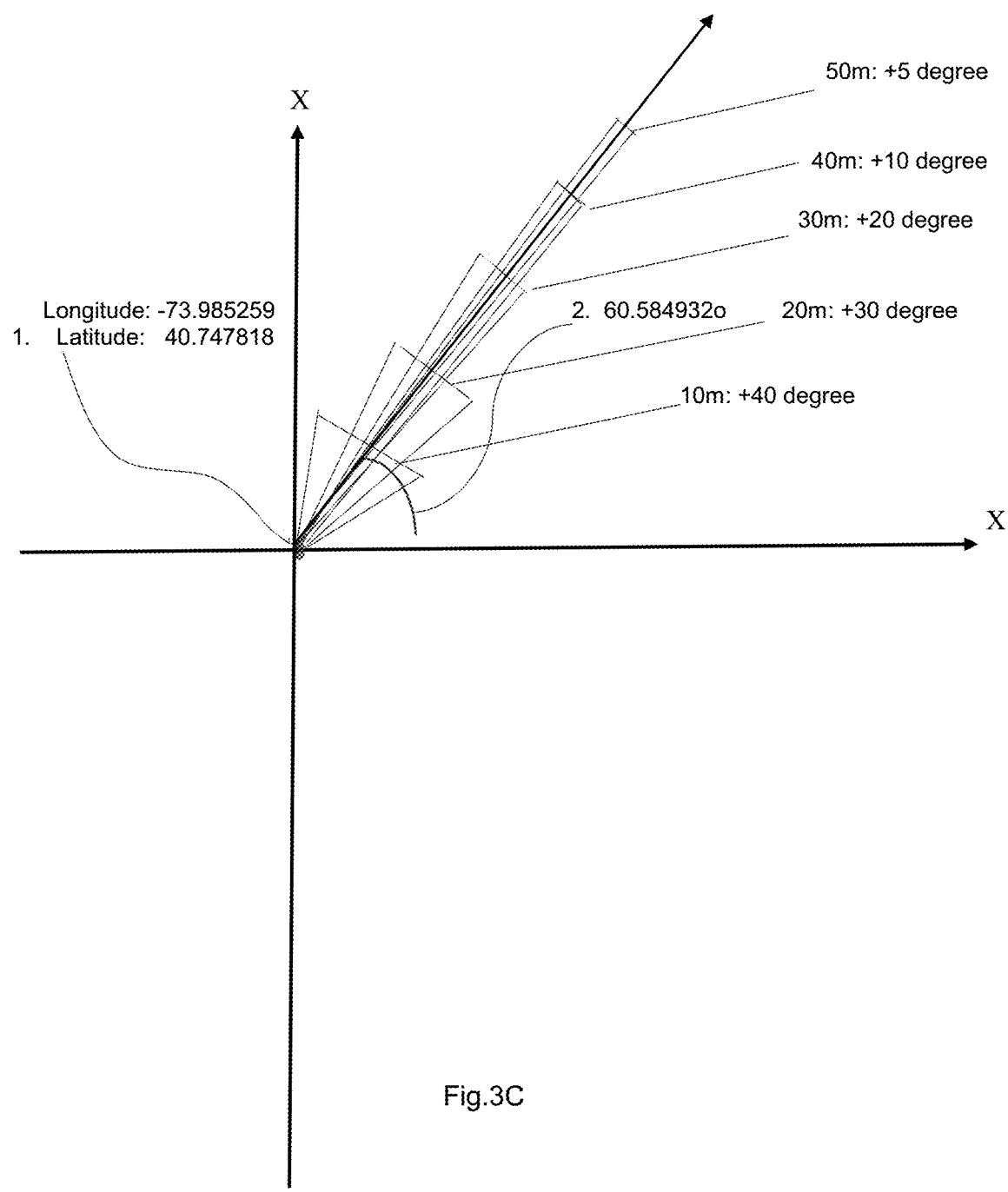
FIG. 3C illustrates a widened search range from position of a mobile device gradually narrowed as user of the mobile device having the mobile software application aims at a direction and searches for information of the targeted location.
Figure 3D:
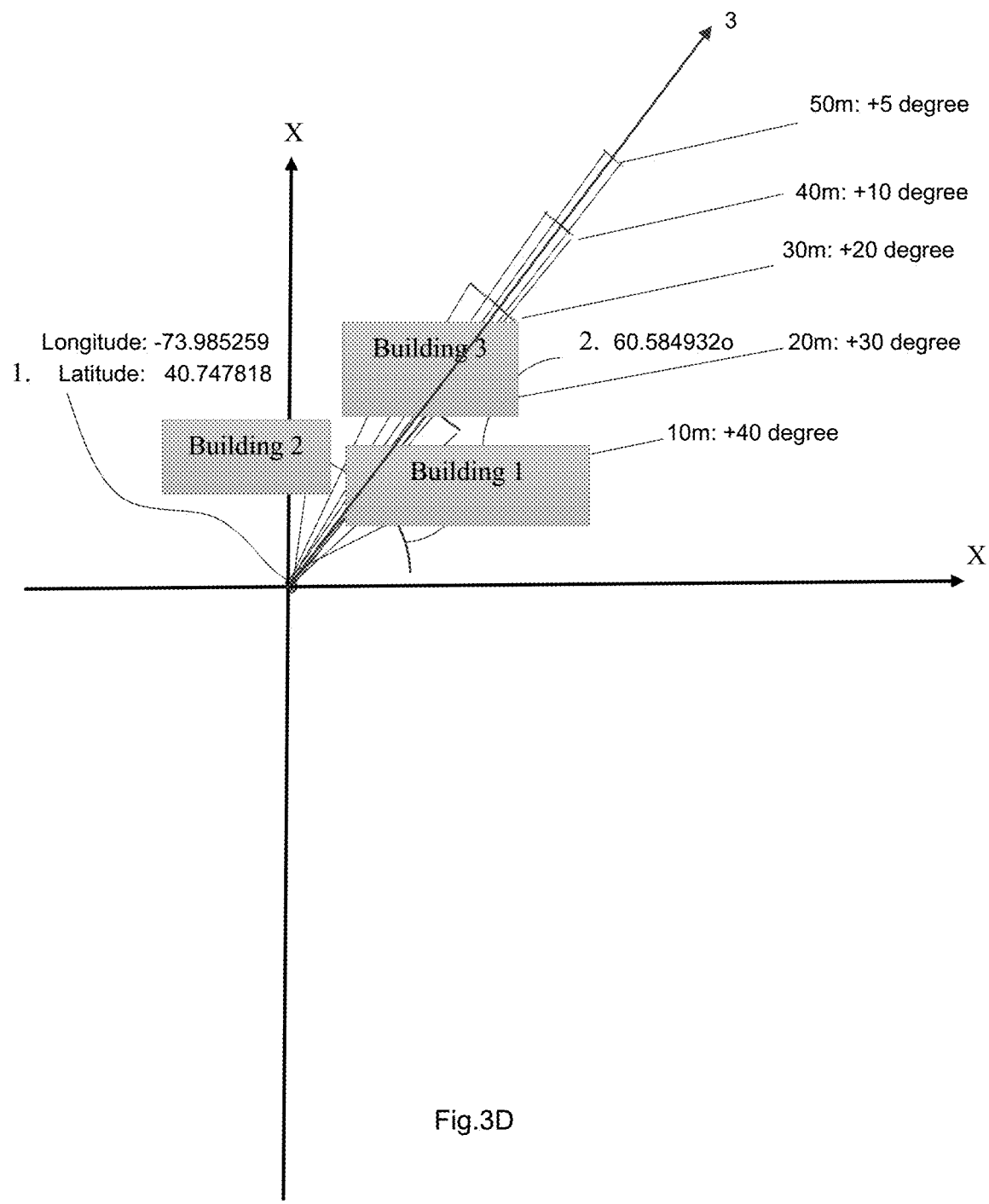
FIG. 3D illustrates an alternate method of widened search range from position of the mobile devices selected location within search range and close to the position of the mobile device.
Figure 3E:
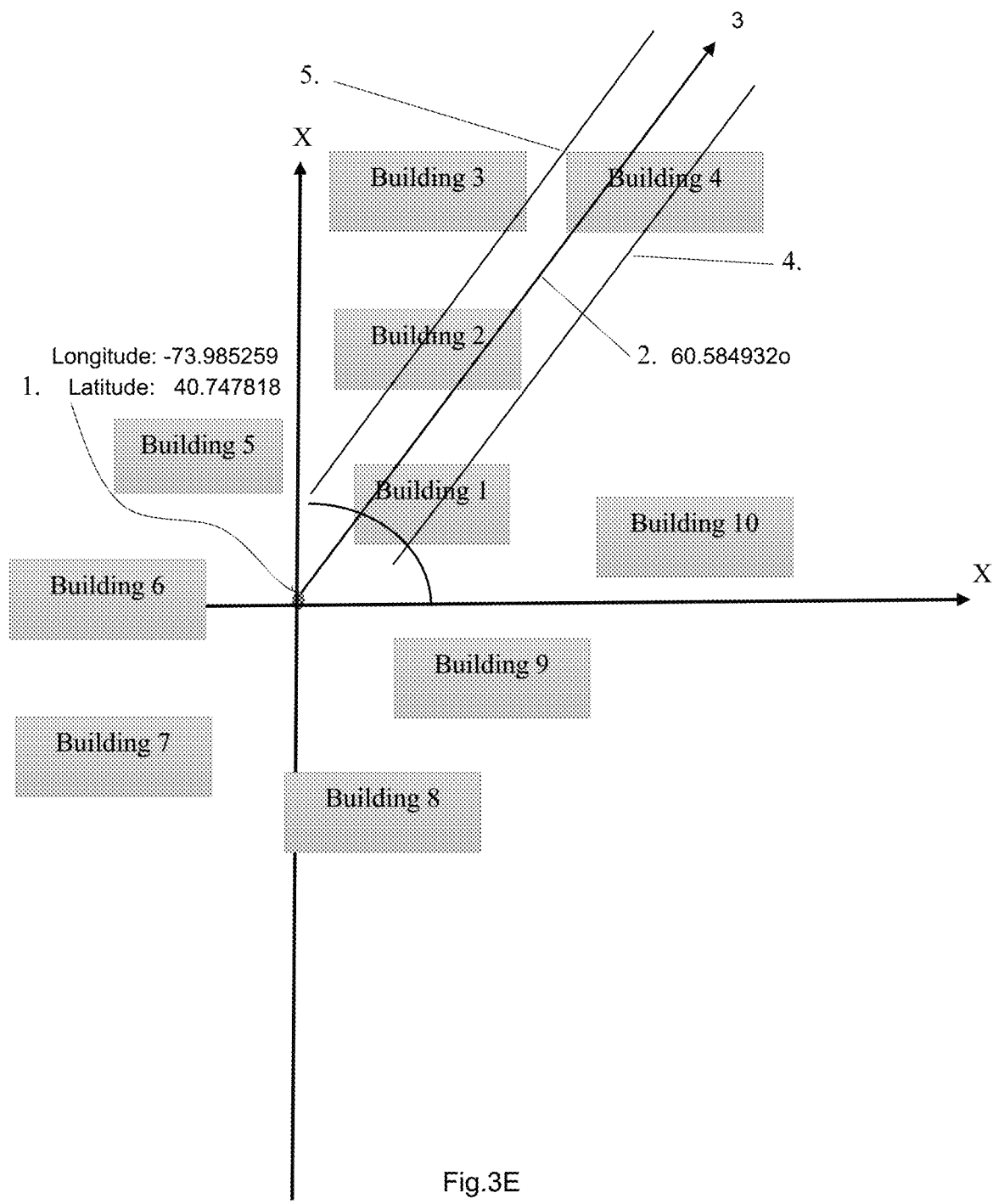
FIG. 3E illustrates an onsite scenario that applies a method of a widened search range to identify a location within a close range.
Figure 3F:
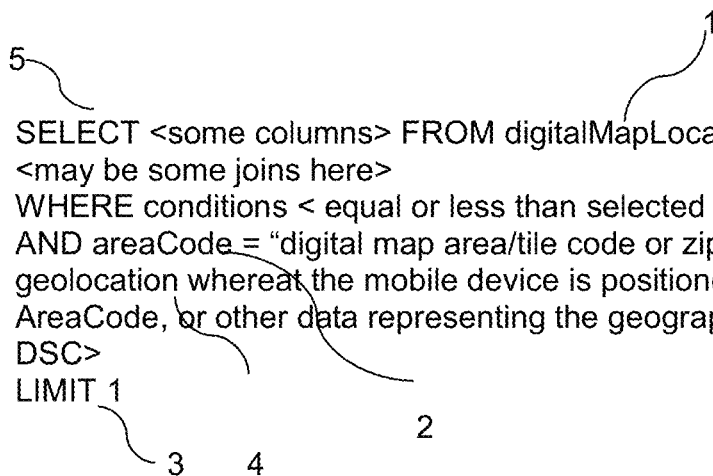
FIG. 3A illustrates a data sheet that demonstrates how data of longitude and latitude is calculated with extrapolating straight line at an aiming direction of a mobile device at each incremental measuring point while checking with real time data of a digital map until data of longitude and latitude is calculated in an incremental measuring point with the extrapolating straight line matching or is within range of longitude and latitude of the first location allocated within the real time data of the digital map.
FIG. 3B illustrates a partial sample data set that demonstrates data recorded in a database table with the database server designed to record and verify when requested to see if a structure is a single location or consists of multi-sub locations.

(New) The first step of this method is that the mobile application is programmed to retrieve the smallest area identification code from the digital map, such as a digital map area or tile, and or its adjacent area or tile within device pointed direction, or a postal zip code, a phone area code, county or city code, state or province code (2 of FIG. 3E). The mobile application logically selects and holds a code covering the smallest area possible in comparison to the other available codes. For instance the selection may starts from a digital map area or tile, or a postal zip code, which may cover smaller area than phone area code, if digital map area or tile or zip code is not available then phone area code is selected and so on and so forth. Then combining the selected area code with geo-position of the mobile device, direction of the mobile device aimed at, predefined search channel and other conditions required a data selection query is created (5 of FIG. 3E) and the data inquiry process gets started. This data inquiry process shall end immediately once first record from the database (3 and 4 of FIG. 3E) containing data of the closest location from geo-position of the mobile device and aiming direction is selected, and said mobile software application displays image of Building 1 with data on the mobile device.

(New) The Purpose of foregoing embodiments is to provide optional methods of swiftly and accurately determining and selecting the best and fastest method of allocating data of targeted location by analyzing data available from digital map on site of the location. To prevent unpredictable search range and results, search range may be programmed to a limited distance or a visual range of naked eyes.

Disclosed herein is an information obtaining system that incorporates aiming a mobile device so as to and select a proximate location and request data thereon utilizing a mobile software application present on the mobile device. The present invention includes a computer system that is configured to store data in various formats in its database wherein the data is uploaded by location owners via secured accounts over a user interface such as but not limited to a website. The computer system is configured to communicate with a mobile software application that has installed thereon a digital aiming device and further includes a GPS module, a digital map and a compass. The mobile software application is configured to communicate with the geographical device and the digital map. The mobile software application is configured to display the direction of the aiming device via a user interface such as but not limited to a display screen. The mobile software application is configured to allow a user of the mobile device to select a location of a structure with a viewfinder-frame displayed on an interface, such as a display screen, of the mobile software application and lock in the location of the structure. The mobile software application is configured to communicate with the geographical location device and digital map and transmit data of geo-position of the mobile device and direction of the aiming device pointing at to the digital map. The mobile software application is configured to display data of the structure received from the digital map via its user interface and the mobile software application is also configured to forward location data of the structure to the remote computer system and further receive data related to the structure from the remote computer system. The mobile software application is configured to display data in various formats received from the remote computer system over its user interface.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A geolocation based information providing system configured to determine and provide information about a selected location comprising:
   providing a mobile device, wherein the mobile device is operably coupled to the Internet, said mobile device further having a digital map, a GPS module, a digital compass and a digital aiming device;
   providing a mobile software application, said mobile software application providing a user interface and user-end operation of the present invention;
   providing a database server, said database server operably coupled to the internet and communicably coupled to the mobile software application;
   installing the mobile software application, wherein the mobile software application is installed onto the mobile device;
   activating the mobile software application on the mobile device;
   pointing the mobile device in a direction;
   determining the geolocation of the mobile device wherein the geolocation of the mobile device is determined utilizing the GPS module;
   extrapolating a straight line in a direction in which the mobile device is pointed, wherein the straight line includes a first endpoint and a second endpoint;
   said first endpoint being the geolocation of the mobile device, said second endpoint being determined by extrapolation of the straight line wherein the straight line is axially aligned with the direction of the mobile device; and
   cross referencing data of said digital map;
   determining a geolocation of the second endpoint, said geolocation of said second endpoint being determined once extrapolation of the straight line reaches a first facility cross referencing data of the digital map;
   matching a geolocation on the extrapolated straight line with the second endpoint;
   providing an image of the first facility located at said second endpoint on the digital map to user via the mobile device;
   requesting confirmation of the image of the first facility from user;
   providing confirmation of the image of the first facility located at said second endpoint; and
   sending information about the first facility located at said second endpoint to the mobile software application installed on the mobile device wherein the information contains details about the first facility and information related to the facility;
   wherein the extrapolated straight line is incrementally extended with intervals for a search and data of the digital map within each interval of incremental straight line is searched, said search is completed when first and closest building is detected.

2. The geolocation based information providing system as recited in claim 1, wherein the mobile software application is configured to communicate with said digital map via an application programming interface wherein said mobile software application is configured to receiv e real time updates regarding location information from said digital map.

3. The geolocation based information providing system as recited in claim 1, and further including the step of creating and updating information about a location, wherein owners of physical locations create and upload information about their physical locations and information pertaining thereto to the database server of the system via a website or software configured with the system.

4. The geolocation based information providing system as recited in claim 1, and further including updating physical location information, wherein information about physical locations is collected from a plurality of data resources and updated on said database server.

5. The geolocation based information providing system as recited in claim 4, and further including verifying the most recently updated information about the physical location, wherein prior to sending information about a physical location thereon is verified that the data is current.

6. The geolocation based information providing system as recited in claim 1, providing a directional arrow in accordance with the digital aiming device, said directional arrow being displayed on the mobile device and operable to indicate a direction in which the mobile device is pointed.

7. The geolocation based information providing system as recited in claim 1, wherein the mobile software application is configured to apply an adjustable distance between intervals for a search according to distances of surrounding locations from the position of the mobile device as to speedily and accurately pinpoint first location that said mobile device is pointed at.

8. The geolocation based information providing system as recited in claim 1, and further including providing multimedia information about the first location, wherein the multimedia is in a plurality of data formats.

9. The geolocation based information providing system as recited in claim 1, and further including providing a view finder, said view finder being displayed on said mobile device, said view finder configured to be utilized to visually target a location.

10. The geolocation based information providing system as recited in claim 1, wherein said mobile software application is configured to display location data received from the digital map via application programming interfaces over a user interface of said mobile software application and further optionally forward key data of said location to remote database server of the system and retrieve data of said location in a plurality of data formats from said database server and display said data over an interface of said mobile software application.

11. A geolocation based information providing system configured to provide information about a facility that is proximate a user comprising the steps of:
   providing a mobile device, wherein the mobile device is a smart phone operably coupled to the Internet, said mobile device having a GPS module, a digital map, a digital aiming device and a digital compass;
   providing a mobile software application, said mobile software application installed on said mobile device and providing a user interface and user-end operation of the present invention;
   providing a database server, said database server operably coupled to the Internet and communicably coupled to said mobile software application, said database server having real time digital map data stored thereon;
   establishing an account, wherein owners and tenants of buildings upload information about their buildings and information pertaining thereto, wherein the information is stored with the digital map data on the database server;
   installing the mobile software application, wherein the mobile software application is installed onto the mobile device;

activating the software application on the mobile device;
pointing the mobile device in a direction;
displaying an arrow, said arrow being displayed on the mobile device, said arrow operable to identify a direction in which the mobile device is pointed;
determining the geolocation of the mobile device, wherein the geolocation of the mobile device is provided by the GPS module;
extrapolating a straight line in the direction in which the mobile device is pointed, wherein the straight line includes a first endpoint and a second endpoint, said second endpoint being determined by extrapolation of the straight line axially aligned with a direction of the digital aiming device, wherein the extrapolation thereof occurs at intervals along the straight line and wherein the straight line further includes a search range on opposing sides of the extrapolated straight line;
cross referencing data of the digital map;
identifying a building wherein the building location is located at the second endpoint;
determining if the building has at least one sublocation;
providing image of the building to user via mobile device;
requesting confirmation of the building from user;
providing confirmation of the building, wherein the user submits confirmation of the building;
sending information about the building to the user via the mobile device wherein the information contains details about the building and its sub-locations;
wherein the extrapolated straight line is incrementally extended with intervals for a search and data of the digital map within each interval of incremental straight line is searched, said search is completed when first and closest building is detected.

12. The geolocation based information providing system as recited in claim 11, wherein the user of the mobile device is located at proximate a building or a location at which the mobile device is being aimed.

13. The geolocation based information providing system as recited in claim 12, wherein only a location that is closest location to the extrapolated straight line and is within predefined searching range is selected.

14. The geolocation based information providing system as recited in claim 13, and further including establishing a search channel, wherein said search channel is an area adjacent to said extrapolated straight line.

15. The geolocation based information providing system as recited in claim 14, wherein the search channel includes an adjustable width along said extrapolated straight line on each side thereof, and said mobile software application is configured to activate the search channel with appropriate width for a search as to reliably allocate a closest location within said search channel.

16. The geolocation based information providing system as recited in claim 14, wherein the search channel includes fixed width or variable width from initial search point and wherein variable width search channels gradually narrow at each search interval along said extrapolated straight line on each side thereof when a user is aimed at a building to obtain related information.

17. The geolocation based information providing system as recited in claim 14, wherein the incrementally extrapolated straight line is calculated in a plurality of lengths with an interval.

18. The geolocation based information providing system as recited in claim 11, and further including providing information about sub-locations of a building or location.

19. The geolocation based information providing system as recited in claim 18, and further including real time data of the digital map, wherein the real time data of the digital map is shared with said mobile software application via an application programming interface.

20. The geolocation based information providing system as recited in claim 11, wherein the mobile software application is configured to setup search range and conditions, and select location data within a geographical area; allocate a closest location in search direction and within predefined search range.

\* \* \* \* \*